United States Patent [19]

Katori

[11] Patent Number: 5,513,321
[45] Date of Patent: Apr. 30, 1996

[54] MULTIPROCESSOR SYSTEM DISCHARGING DATA IN NETWORKING APPARATUS IN RESPONSE TO OFF-LINE INFORMATION FROM RECEIVER-SIDE PROCESSOR

[75] Inventor: Masayuki Katori, Kawasaki, Japan

[73] Assignee: Fujitsu Limited, Kawasaki, Japan

[21] Appl. No.: 110,936

[22] Filed: Aug. 24, 1993

[30] Foreign Application Priority Data

Dec. 22, 1992 [JP] Japan ................................. 4-342357

[51] Int. Cl.$^6$ ................................. G06F 15/173
[52] U.S. Cl. .................................... 395/200.15; 370/60.1; 395/183.15; 395/200.11; 395/200.12; 395/200.13; 395/200.01
[58] Field of Search ................................. 370/60, 60.1, 61; 395/200, 250, 325, 183.15, 200.01, 200.11, 200.15, 200.12, 200.13

[56] References Cited

U.S. PATENT DOCUMENTS

| | | | |
|---|---|---|---|
| 4,297,567 | 10/1981 | Herzner | 377/71 |
| 4,873,666 | 10/1989 | Lefebure et al. | 365/189.07 |
| 4,890,281 | 12/1989 | Balboni et al. | 370/60 |
| 5,099,475 | 3/1992 | Kozaki et al. | 370/60 |
| 5,123,089 | 6/1992 | Beilinski et al. | 395/200 |
| 5,253,346 | 10/1993 | Okabayashi et al. | 395/325 |
| 5,274,631 | 12/1993 | Bhardwaj | 370/60 |

*Primary Examiner*—Ken S. Kim
*Attorney, Agent, or Firm*—Staas & Halsey

[57] ABSTRACT

A multiprocessor system containing a networking apparatus and a plurality of processors for transferring data through the networking apparatus from one to another of the plurality of processors. At least one receiving-side processor transmits a transfer allowance signal to the networking apparatus when the processor is ready to receive data, and transmits an on-line/off-line signal to the networking apparatus, where the on-line/off-line signal indicates whether the second processor is in an on-line state or off-line state. The networking apparatus includes a data transfer control unit, provided on each route for transferring data, for receiving data transferred from one of transmitting-side processors, temporarily storing the data, and transferring the data to one of the receiving-side processor when the data transfer control unit receives the transfer allowance signal from the second processor; and an off-line state detecting unit for outputting a data discharge control signal to the data transfer control unit when the on-line/off-line signal indicates that the second processor is in the off-line state. The data transfer control unit further contains a data discharge unit for discharging the data temporarily stored in the data transfer control unit in response to the data discharge control signal, regardless of the transfer allowance signal.

10 Claims, 10 Drawing Sheets

MULTIPROCESSOR SYSTEM DISCHARGING DATA IN NETWORKING APPARATUS IN RESPONSE TO OFF-LINE INFORMATION FROM RECEIVER-SIDE PROCESSOR

BACKGROUND OF THE INVENTION

1. Field of the Invention

The present invention relates to a multiprocessor system containing a plurality of processors and a networking apparatus which establishes physical links between the plurality of processors.

2. Description of the Related Art

In some types of parallel processing systems containing a plurality of processors, a networking apparatus is provided for transferring data between the plurality of processors. The networking apparatus receives a connection request from one of the plurality of data processing apparatuses, and establishes a physical link between the processor which sends the connection request to the networking apparatus and another of the plurality of data processing apparatuses which is requested by the connection request. Usually, in such a networking apparatus, a plurality of jobs are concurrently executed, and a processor on a receiving side may go into an off-line state during a data transfer operation from the other processor to the processor on the receiving side due to some cause. In such a case, the data transfer stops in a data route in the networking apparatus, and such a stop of a data transfer in a route in the networking apparatus affects the total operation of the networking apparatus, and thus affects the other data transfer operations through the networking apparatus.

FIG. 1 is a diagram illustrating an outlined construction of a multiprocessor system to which the present invention is applied. In FIG. 1, reference numerals 11 to in each denote a processor, 2' denotes a networking apparatus, and 3 denotes a service processor. The plurality of processors $1_1'$ to $1_n'$ respectively execute jobs assigned to them under control of the service processor 3, in the manner of parallel processing. The networking apparatus 2 establishes a physical link between such processors for data transfers between the processors.

FIG. 2 is a diagram illustrating an outlined construction of a multiprocessor system to which the present invention is applied. In FIG. 2, reference numerals $101_1, 101_2 \ldots 101_n$ each denote a processor on the transmitting side, 2' denotes a networking apparatus, 4 denotes a switch unit, $5_1', 5_2', \ldots 5_n'$ each denote a data transfer control unit, and $102_1, 102_2 \ldots 102_n$ each denote a processor on the receiving side. In FIG. 2, portions of the processors $1_1'$ to $1_n'$ of FIG. 1 containing functions of transmitting data are respectively indicated as the processors $101_1, 101_2 \ldots 101_n$ on the transmitting side, and portions of the processors $1_1'$ to $1_n'$ containing functions of receiving data are respectively indicated as the processors $102_1, 102_2 \ldots 102_n$ on the receiving side. The networking apparatus 2 contains the switch unit 4 and a plurality of data transfer control units $5_1', 5_2', \ldots 5_n'$ provided corresponding to the respective processors $102_1, 102_2 \ldots 102_n$ on the receiving side. The switch unit 4 has a plurality of transmitting-side ports corresponding to the plurality (n) of the processors $101_1, 101_2 \ldots 101_n$ on the transmitting side, and a plurality of receiving-side ports corresponding to the plurality (n) of the processors $102_1, 102_2 \ldots 102_n$ on the receiving side. The switch unit 4 receives one or more connection requests with route information from one or more processors, and establishes a physical link (a route for a data transfer) from each transmitting-side processor to a corresponding receiving-side processor after priority control in response to the connection requests. Each data transfer control unit $5_1', 5_2', \ldots 5_n'$ receives at an input port thereof data transferred from a corresponding one of the transmitting-side processors $101_1, 101_2 \ldots 101_n$ through the switch unit 4, and connects each output port thereof with a corresponding one of the receiving-side processors $102_1, 102_2 \ldots 102_n$. Each data transfer control unit $5_1', 5_2', \ldots 5_n'$ contains a data buffer circuit for temporarily storing data received as above, and transfers the temporarily stored data to the corresponding receiving-side processor when the data transfer control unit receives a transfer allowance signal transmitted from the corresponding receiving-side processor. Each data transfer control unit further contains a counter for counting an amount of data currently stored in the data buffer circuit. The count of the counter is incremented when the data is newly stored in the data buffer circuit, and is decremented every time a unit amount of data is transferred from the data buffer circuit to the corresponding receiving-side processor. When the count of the counter reaches a predetermined maximum allowable value, the data transfer is stopped.

However, when one of the receiving-side processors $102_1, 102_2 \ldots 102_n$ fails during the data transfer operation, the receiving-side processor cannot transmits the transfer allowance signal to the corresponding data transfer control unit. Therefore, the count of the counter reaches the predetermined maximum value, and data transfer is stopped in the data transfer control unit and this causes the data transfer control unit to hang up. In conventional networking apparatuses, it is necessary to reset the whole networking apparatus to recover a data transfer route through a hung-up data transfer control unit. Therefore, all of the data transfer operations for all of the other jobs must to be stopped due to the hang-up in one route (data transfer control unit).

SUMMARY OF THE INVENTION

An object of the present invention is to provide a multiprocessor system wherein, when a receiving-side processor fails during a data transfer operation, the other data transfer operations are not affected by the failure of the receiving-side processor.

According to the present invention, there is provided a multiprocessor system containing a networking apparatus and a plurality of processors for transferring data through the networking apparatus from one to another of the plurality of processors. At least one first processor among the plurality of processors contains a transmitting unit, connected to the networking apparatus, for transmitting data to the networking apparatus. At least one second processor among the plurality of processors contains a receiving unit, connected to the networking apparatus, for receiving data transferred from the networking apparatus, a transfer allowance signal transmitting unit for transmitting a transfer allowance signal to the networking apparatus when the receiving unit is ready to receive data, and an on-line/off-line signal transmitting unit for transmitting an on-line/off-line signal to the networking apparatus, where the on-line/off-line signal indicates whether the second processor is in an on-line state or off-line state. The networking apparatus comprises: a switch unit for providing a route for transferring data between each of the at least one first processor, and one of the at least one second processor corresponding to each first processor. The networking apparatus further comprises a data transfer control unit, provided on each route for transferring data, for receiving data transferred from one of the at least one first processor connected to the route, temporarily storing the data, and transferring the data to one of the at least one second processor connected to the route, when the data transfer control unit receives the transfer allowance signal from the second processor. In addition the networking apparatus also comprises and an off-line state detecting unit for receiving the on-line/off-line signal, and generating and outputting a data discharge control signal to the data transfer control unit, when the on-line/off-line signal indicates that the second processor is in the off-line state. The data transfer control unit further comprises a data discharge unit for receiving the data discharge control signal, and discharging the data temporarily stored in the data transfer control unit in response to the data discharge control signal, regardless of the transfer allowance signal.

(a) In the above multi-processor system, the receiving unit contains a buffer memory for temporarily storing the data transferred from the data transfer control unit. The transfer allowance signal transmitting unit outputs the transfer allowance signal when the data temporarily stored in the buffer memory is output therefrom. The data transfer control unit comprises: a FIFO memory for receiving the data transferred from the first processor connected to the route on which the data transfer control unit is provided, and temporarily storing the data. The data transfer control unit further comprises and a counter for counting an amount of the data temporarily stored in the buffer memory by incrementing a value of the count thereof when the data is output from the FIFO memory, and decrementing the count when the data transfer control unit receives the transfer allowance signal.

(b) In the above multi-processor system (a), the counter outputs a first control signal which is applied to the FIFO memory to make the FIFO memory stop outputting the data, when the count reaches a predetermined count corresponding to a maximum amount of data which can be held in the buffer memory.

(c) In the above multi-processor system (b), the counter further outputs a second control signal which is active when the count is equal to zero. The off-line state detecting unit activates the data discharge control signal when the second control signal is not active, and the on-line/off-line signal indicates that the second processor is in the off-line state.

(d) In the above multi-processor system (b), the data discharge control signal is applied to the counter as a count-down control signal which makes the counter decrement the value of the count.

DESCRIPTION OF THE PREFERRED EMBODIMENTS

Figure 3:
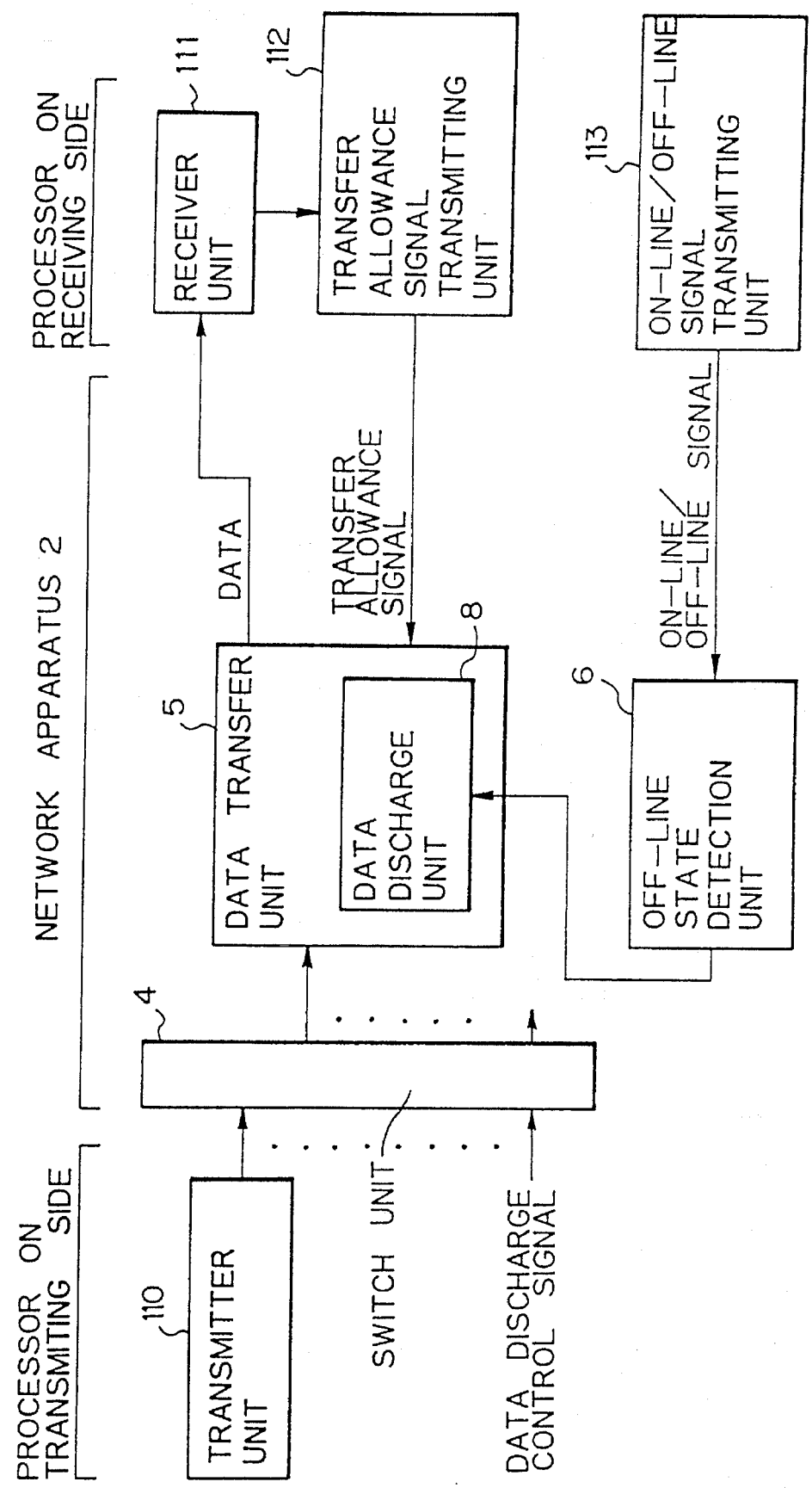
FIG. 3 is a diagram illustrating an outlined construction of a multiprocessor system to which the present invention is applied.

FIG. 3 is a diagram illustrating an outlined construction of a multiprocessor system to which the present invention is applied. The multiprocessor system of FIG. 3 contains a plurality of processors $1_1$ to $1_n$, and a networking apparatus 2 through which data transfer operations are performed among the plurality of processors $1_1$ to $1_n$ from one to another. At least one of the plurality of processors $1_1$ to $1_n$ (transmitting-side processor) is connected to the networking apparatus 2, and comprises a transmitter unit 110 for transmitting data to the networking apparatus 2. At least one of the plurality of processors $1_1$ to $1_n$ (receiving-side processor) is connected to the networking apparatus 2, and comprises a receiver unit 111 for receiving data transferred from the networking apparatus 2, a transfer allowance signal transmitting unit 112, and an on-line/off-line signal transmitting unit 113. The transfer allowance signal transmitting unit 12 transmits a transfer allowance signal to the networking apparatus when the receiver unit 11 is ready to receive data. The on-line/off-line signal transmitting unit 113 transmits an on-line/off-line signal to the networking apparatus 2, where the on-line/off-line signal indicates whether or not the processor to which the on-line/off-line signal transmitting unit 113 belongs is in an on-line state or in an off-line state. The networking apparatus 2 comprises a switch unit 4, a data transfer control unit 5, and an off-line state detection unit 6. The switch unit 4 provides a route for data transfer between each transmitting-side processor and a corresponding receiving-side processor. The data transfer control unit 5 is provided on a corresponding route for data transfer, receives and temporarily stores data transferred from the receiving-side processor, and transfers the data temporarily stored therein to the corresponding receiving-side processor when the data transfer control unit receives the transfer allowance signal from the receiving-side processor. The off-line state detection unit 6 receives the on-line/off-line signal, and outputs a data discharge signal to the data transfer control unit 5 when the off-line state detection unit 6 receives the on-line/off-line signal, and the on-line/off-line signal indicates that the receiving-side processor is in an off-line state. The data transfer control unit 5 comprises a data discharge unit 8 which discharges the data temporarily stored in the data transfer control unit regardless of the transfer allowance signal when the data discharge unit 8 receives the data discharge signal.

By the multiprocessor system according to the present invention, when the receiving-side processor goes into the off-line state, the on-line/off-line signal indicating that the receiving-side processor is in the off-line state, is transmitted to the networking apparatus 2. The off-line state detection unit 6 detects the indication of the on-line/off-line signal to drive the data discharge unit. That is, the data discharge unit 8 outputs a data discharge control signal to the data transfer control unit 5. In response to the data discharge control signal, the data transfer control unit 5 discharges the data temporarily stored therein, regardless of the reception of the transfer allowance signal. Thus, data stored in the data transfer control unit 5 corresponding to the receiving-side processor which has gone into an off-line state during the data transfer operation, is automatically discharged. Namely, data stored in the data transfer control unit 5 corresponding to the receiving-side processor which has gone into the off-line state during the data transfer operation, is substantially reset without affecting the other data transfer control units in the networking apparatus 2. Therefore, data transfer operations carried out through the other data transfer control units in the networking apparatus 2 need not be stopped.

Figure 1:
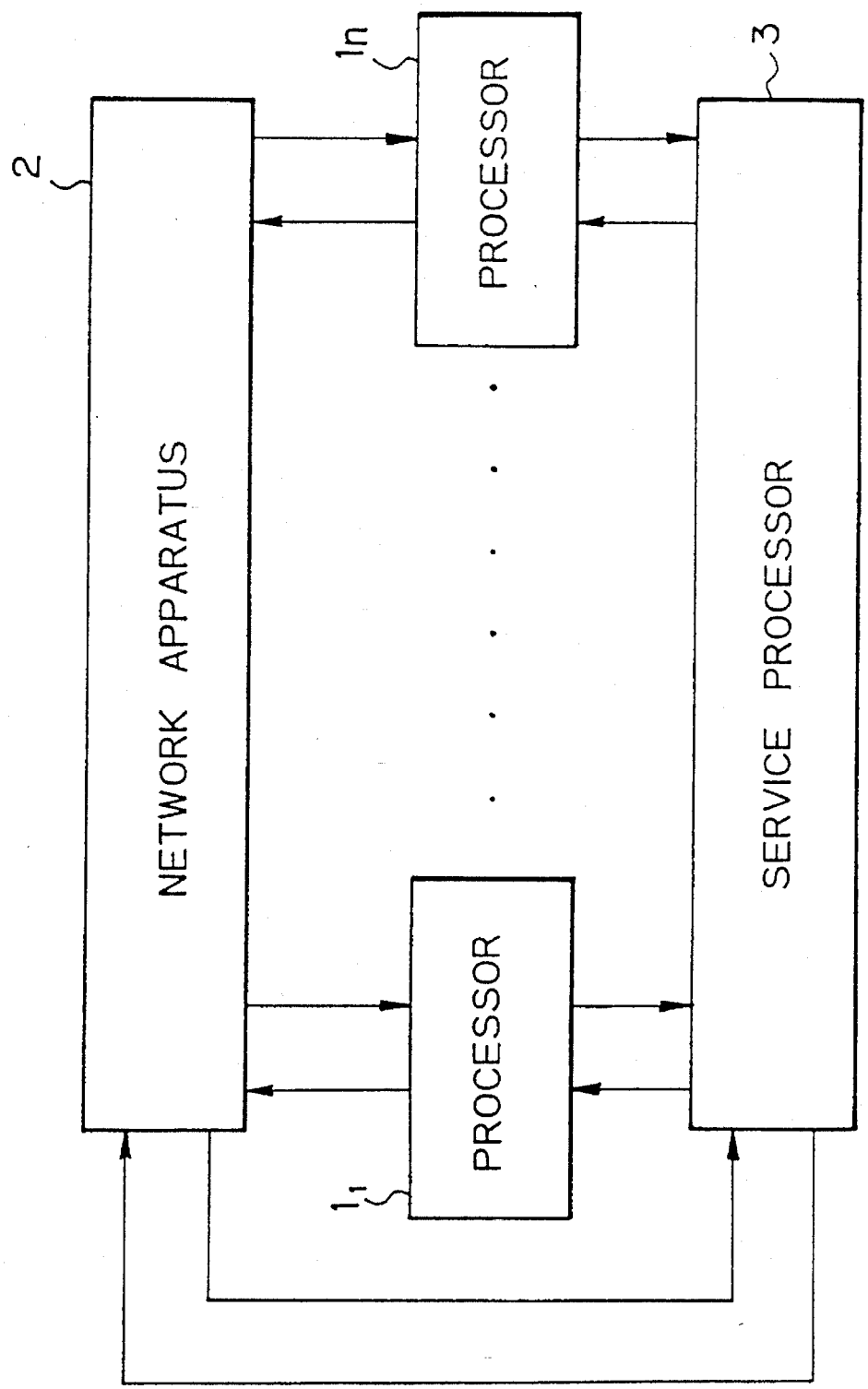
FIG. 1 is a diagram illustrating an outlined construction of a multiprocessor system to which the present invention is applied.
Figure 4:
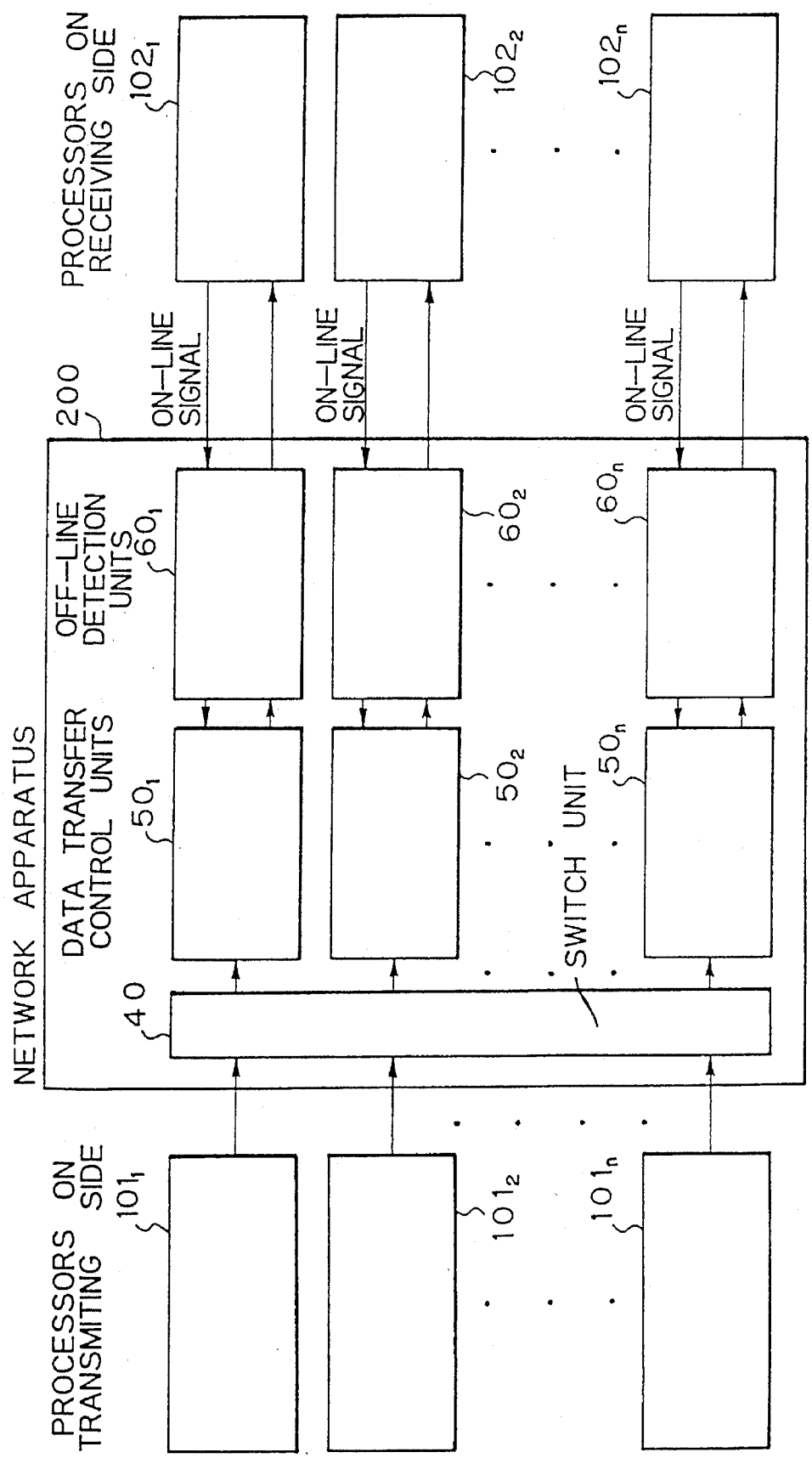
FIG. 4 is a diagram illustrating an outlined construction of the networking apparatus to which the present invention is applied.

FIG. 4 is a diagram illustrating an outlined construction of the networking apparatus to which the present invention is applied. In FIG. 4, reference numerals $101_1$, $101_2$, ... $101_n$ each denote a transmitting-side processor, 200 denotes a networking apparatus, 40 denotes a switch unit, $50_1$, $50_2$, ... $50_n$ each denote a data transfer control unit, $60_1$, $60_2$, ... $60_n$ each denote an off-line state detection unit, and $102_1$, $102_2$, ... $102_n$ each denote a receiving-side processor. In FIG. 4, similar to FIG. 2, portions of the processors $1_1$, $1_2$, ... $1_n$ of FIG. 1 comprising functions of transmitting data are respectively indicated as the processors $101_1$, $101_2$ ... $101_n$ on the transmitting side, and portions of the processors $1_1$, $1_2$, ... $1_n$ comprising functions of receiving data are respectively indicated as the processors $102_1$, $102_2$ ... $102_n$ on the receiving side.

The networking apparatus 200 comprises the switch unit 40, a plurality of data transfer control units $50_1$, $50_2$, ... $50_n$, and a plurality of off-line state detection units $60_1$, $60_2$, ... $60_n$, respectively corresponding to the plurality of processors on the transmitting-side and the receiving-side. The switch unit 40 is provided with a plurality (n) of input ports and a plurality (n) of output ports, respectively corresponding to the plurality of processors $1_1$, $1_2$, ... $1_n$ of FIG. 1. The switch unit 40 receives one or more connection requests with route information from one or more processors, and establishes a physical link (a route for a data transfer) from each transmitting-side processor to a corresponding receiving-side processor after priority control in response to the connection requests. Each data transfer control unit $50_1'$, $50_2'$, ... $50_n'$ receives at an input port thereof, data transferred from a corresponding one of the transmitting-side processors $101_1$, $101_2$ ... $101_n$ through the switch unit 40, and connects each output port thereof with a corresponding one of the receiving-side processors $102_1$, $102_2$ ... $102_n$. Each data transfer control unit $50_1'$, $50_2'$, ... $50_n'$ comprises a data buffer circuit for temporarily storing data received as above, and transfers the temporarily stored data to the corresponding receiving-side processor when the data transfer control unit receives the transfer allowance signal (not shown in FIG. 4) transmitted from the corresponding receiving-side processor.

The plurality of off-line state detection units $60_1$, $60_2$, ... $60_n$ are provided corresponding to the plurality of data transfer control units. Each off-line state detection unit $60_j$ (j=1 to n) receives an on-line/off-line signal from a corresponding one of the plurality of receiving-side processors $102_1$, $102_2$ ... $102_n$, and outputs a data discharge signal to the corresponding data transfer control unit $50_j$ (j=1 to n) when the off-line state detection unit $60_j$ receives the on-line/off-line signal, and the on-line/off-line signal indicates that the corresponding receiving-side processor is in an off-line state. The data transfer control unit $50_j$ contains the aforementioned data discharge unit 8 (not shown in FIG. 4) which discharges the data temporarily stored in the data transfer control unit regardless of the transfer allowance signal when the data discharge unit 8 receives the data discharge signal.

Figure 2:
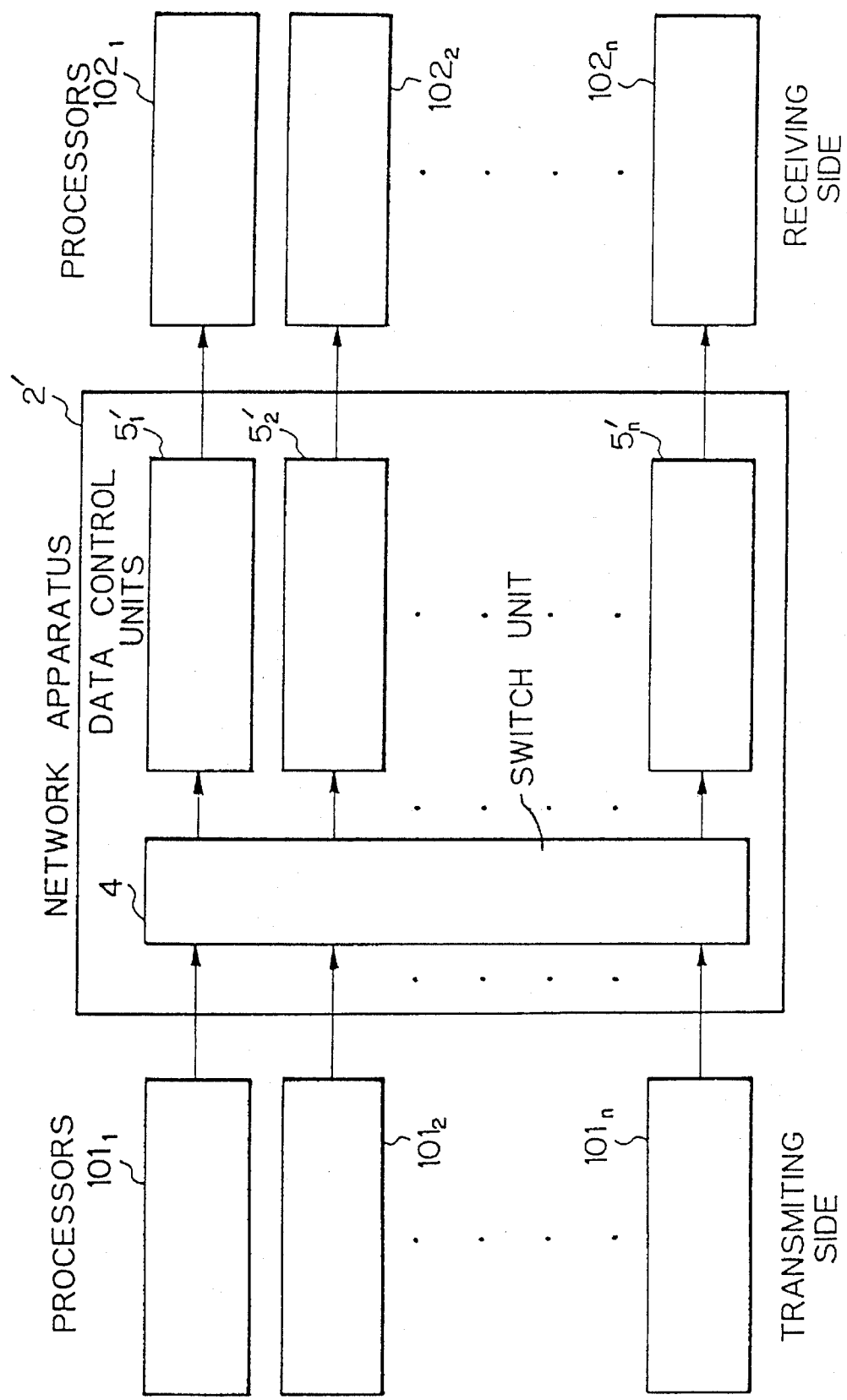
FIG. 2 is a diagram illustrating an outlined construction of a multiprocessor system to which the present invention is applied.
Figure 5:
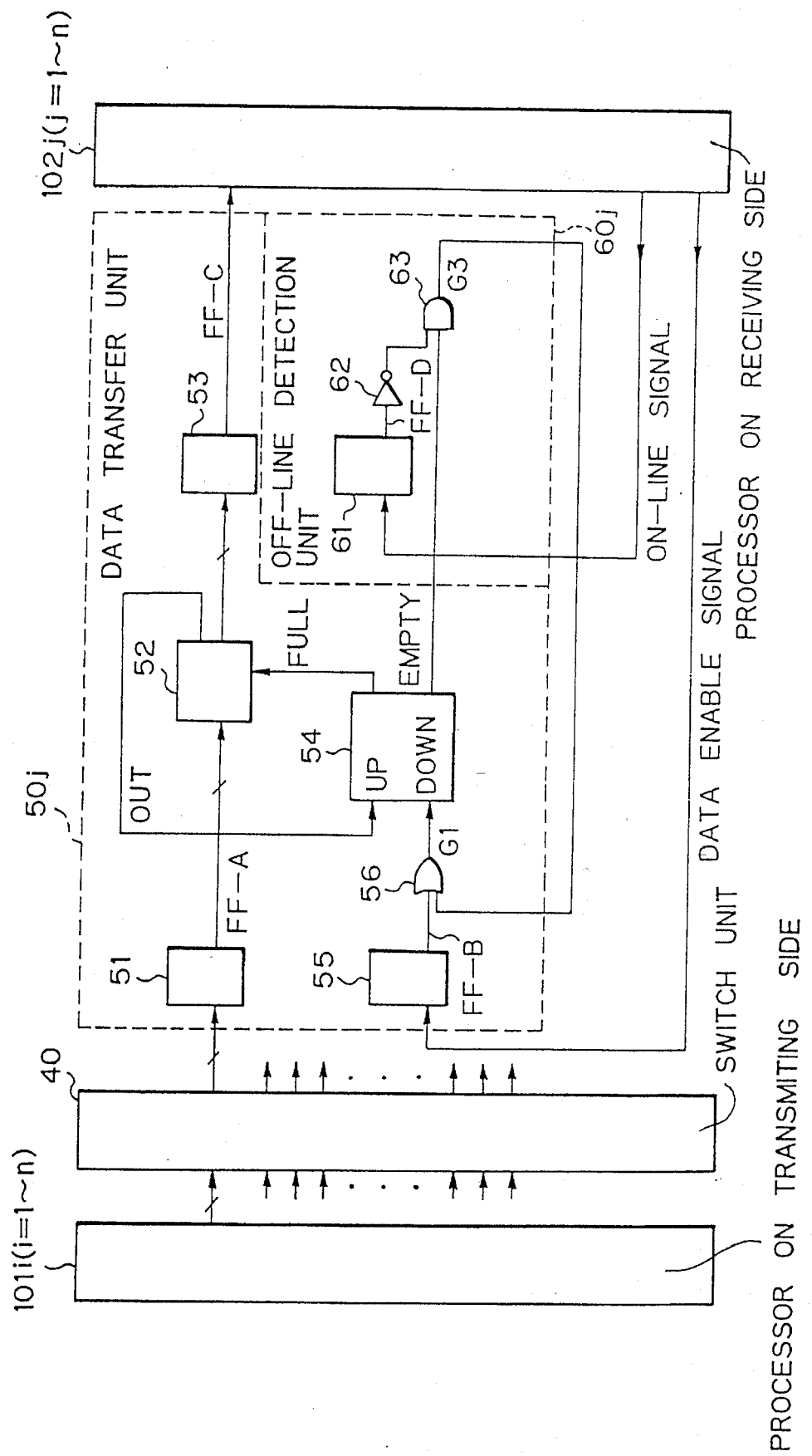
FIG. 5 is a diagram illustrating an example of an outlined construction of the networking apparatus of FIG. 2 containing a data transfer control unit $50_j$, and an off-line detection unit $60_j$.

FIG. 5 is a diagram illustrating an example of an outlined construction of the networking apparatus of FIG. 2 comprising a data transfer control unit $50_j$ and an off-line detection unit $60_j$, where j=1 to n. In the data transfer control unit $50j$ shown in FIG. 5, reference numerals 51 and 53 each denote a data register, 55 denotes a D-type flip flop circuit, 52 denotes a first-in-first-out (FIFO) memory, 54 denotes an up-down counter, and 56 denotes an OR gate. In the off-line state detection unit $60_j$ shown in FIG. 5, reference numeral 61 denotes a D-type flip flop circuit, 62 denotes an inverter, and 63 denotes an AND gate.

Data transferred from the transmitting-side processor through the switch unit 40, is latched in the data register 51, and the output of the data register 51 (denoted by FF-A) is then held in the FIFO memory 52 in the transferred order. A first control signal (denoted by FULL) output from the up-down counter 54 is applied to the FIFO memory 52. The FIFO memory 52 outputs the data held therein through the data register 53 to the corresponding receiving-side processor $102_j$ in the above transferred order, where the output of the data register 53 is denoted by FF-C. The receiving-side processor $102_j$ outputs a data enable signal when the receiving-side processor completes reception of a preceding data, and becomes ready to receive the next data. The data enable signal is latched in the D-type flip flop circuit 55, and the output of the D-type flip flop circuit 55 (denoted by FF-B) is applied to one of two input terminals of OR gate 56. The output (denoted by G1) of the OR gate 56 is then applied to a down input terminal DOWN of the up-down counter 54. Thus, the count of the up-down counter 54 is decremented every time the data transfer control unit $50_j$ receives the data enable signal from the corresponding receiving-side processor $102_j$. On the other hand, a signal OUT is output from the FIFO memory 52 every time data is output therefrom, and the signal OUT is applied to an up input terminal UP of the up-down counter 54. Thus, the count of the up-down counter 54 is incremented every time the signal OUT is received. In the up-down counter 54, a predetermined maximum value corresponds to a data capacity of a reception buffer circuit (not shown) in the receiving-side processor $102_j$. When the count of the up-down counter 54 reaches the maximum value, the signal FULL output from the up-down counter 54 becomes "1". When the signal FULL is "1", the output of the FIFO memory 52 is stopped. Therefore, in the case wherein the off-line state detection unit $60_j$ according to the present invention is not equipped, when the receiving-side processor $102_j$ is in an off-line state, the count of the up-down counter 54 is incremented every time data is output from the FIFO memory 52, since the data enable signal is not output from the receiving-side processor $102_j$ in the off-line state. Then, the count finally reaches the maximum value to change the FULL signal to "1", and therefore the output of the FIFO memory 52 is stopped.

The off-line state detection unit 60j provided according to the present invention, monitors the on-line/off-line signal output from the receiving-side processor $102_j$. That is, the off-line state detection unit $60_j$ latches the on-line/off-line signal in the D-type flip flop circuit 61, and the output (denoted by FF-D) of the D-type flip flop circuit 61 is applied through the inverter 62 to one of two input terminals of the AND gate 63. The up-down counter 54 further outputs another signal EMPTY which becomes zero when the count of the up-down counter 54 reaches zero, and the signal EMPTY is applied to the other input terminal of the AND gate 63. The output (denoted by G3) of the AND gate, which is the output of the off-line state detection unit $60_j$, is then applied to the other input terminal of the OR gate 56 in the corresponding data transfer control unit $50_j$. Thus, when the receiving-side processor $102_j$ goes into an off-line state during a data transfer operation, the output signal G3 from the off-line state detection unit $60_j$ is applied through the OR gate 56 to the down input terminal DOWN of the up-down counter 54. Therefore, the count of the up-down counter 54 is decremented until the count of the up-down counter 54 reaches zero, and the above first control signal FULL is maintained to "0". Thus, all of the data held in the FIFO memory 52 is discharged. Namely, both the FIFO memory 52 and the up-down counter 54 are reset to an initial state. During the above operations on the route of one data transfer operation, data transfer operations through the other data transfer control units $50_k$ (k≠j) in the networking apparatus 200 are not affected by the above operations in data transfer control units $50_j$.

Figure 6:
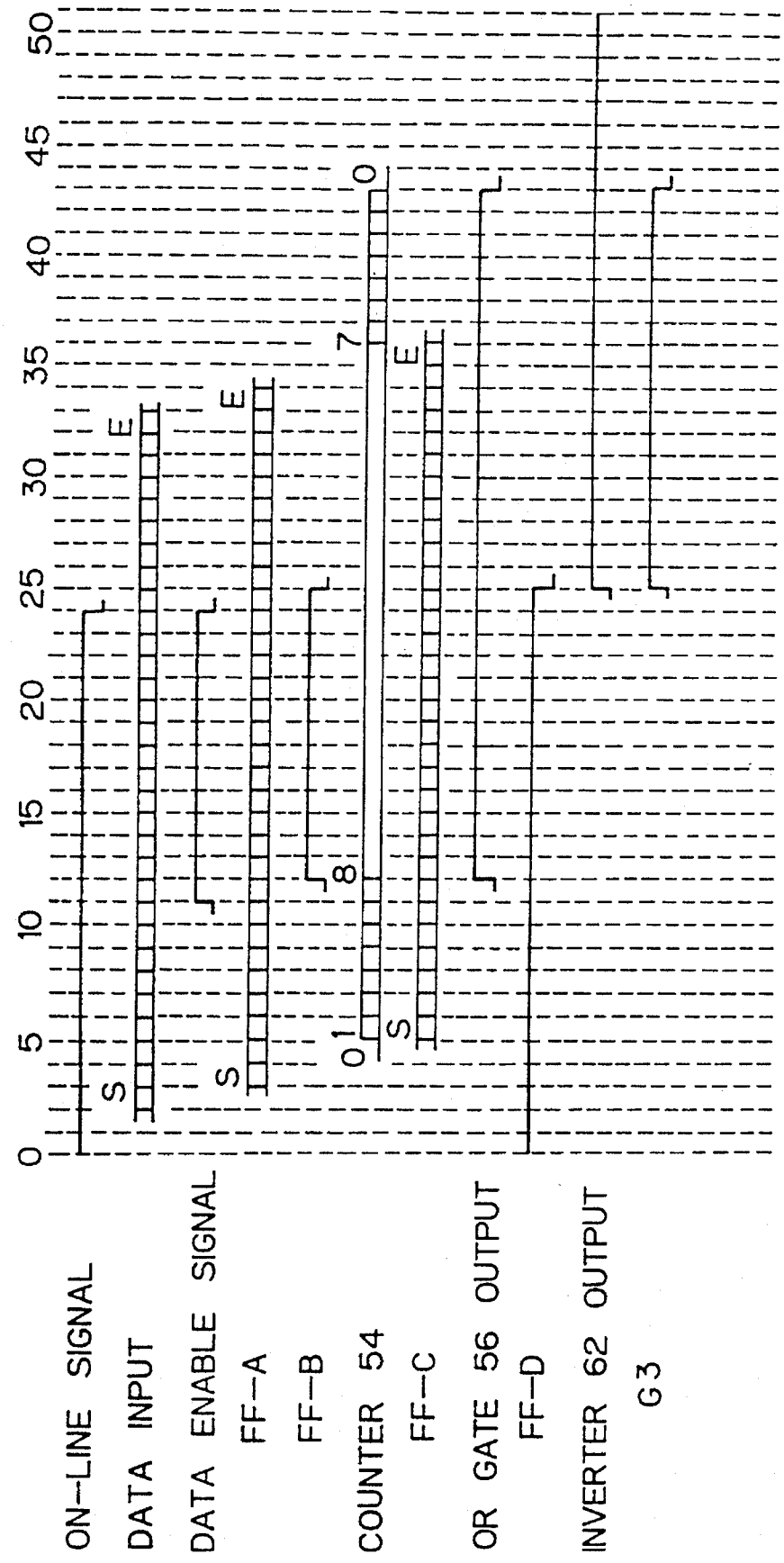
FIG. 6 is a diagram illustrating an example timing of the operation of the construction of FIG. 3.

FIG. 6 is a diagram illustrating an example timing of the operation of the construction of FIG. 3. Until the on-line/off-line signal changes from "1" to "0" at time 24, data applied to the data transfer control unit $50_j$, appears in the output FF-A of the data register 51 at the next timing, and then appears in the output (FF-C) of the data register 53 after passing through the FIFO memory 52. Since the data enable signal is not output from the receiving-side processor $102_j$ until time 11, the count of the up-down counter 54 is incremented from one up to eight. When the data enable signal, which becomes active at time 11, is latched in the D-type flip flop circuit 55 at time 12, the output G1 of the OR gate 56 also becomes active. Therefore, the count of the up-down counter 54 does not change for each cycle since the count of the up-down counter 54 is incremented corresponding to the data output from the FIFO memory 52, and is decremented due to the active output of the OR gate 56. When the on-line/off-line signal becomes "0" at time 24, the output FF-D of the D-type flip flop circuit 63 becomes "1" at the next time 25, and the output of the inverter 62 and the output G3 of the AND gate 63 become "1". Therefore, the count-down control by the active output G1 of the OR gate 56 to the up-down counter 54 is continued, and the data output from the FIFO memory 52 is continued. As explained later, the "0" state of the on-line/off-line signal, i.e., the off-line indication of the on-line/off-line signal is informed through the service processor 3 to the corresponding transmitting-side processor $101_j$, and thus the data transmission from the transmitting-side processor $101_j$ is stopped at time 33. Due to the above control, the last data (denoted by E) is output from the FIFO memory 52, and appears in the output FF-C of the data register 53 at time 36. Since no data is held in the FIFO memory 52 after time 36, the count-up control of the up-down counter 54 is not performed any more, and only the count-down control is performed. Therefore, the count of the up-down counter 54 decreases from time 36, and reaches zero at time 43. Thus, the data transfer control unit $50_j$ is reset.

Figure 7:
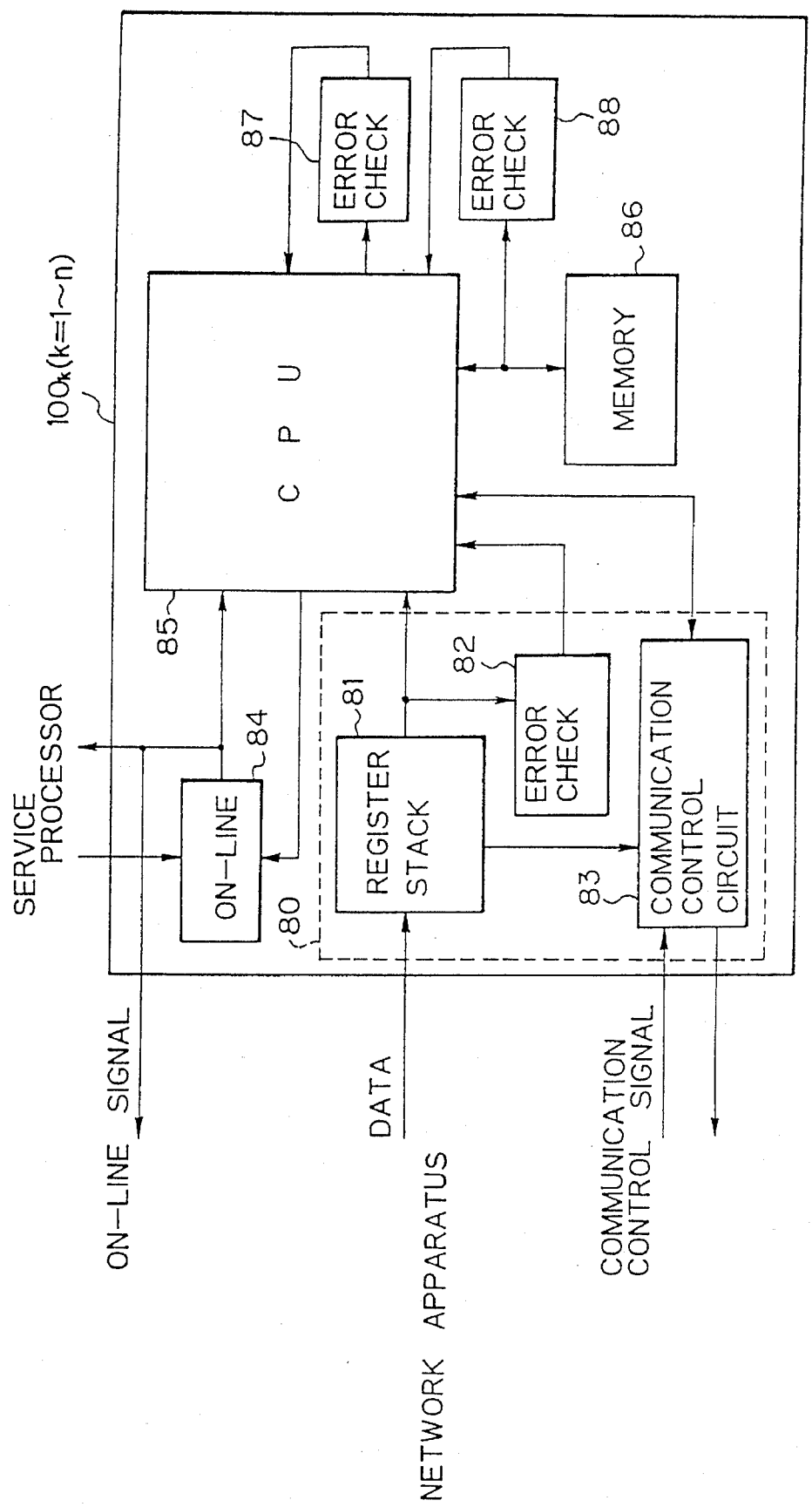
FIG. 7 is a block diagram illustrating a portion relating to the present invention, of the construction of each processor in the multiprocessor system according to the present invention.

FIG. 7 is a block diagram illustrating a portion relating to the present invention, of the construction of each processor in the multiprocessor system according to the present invention. In FIG. 7, reference numerals $100_k$ (k=1 to n) each denote a processor, 80 denotes a data input/output circuit, 81 denotes a register stack (FIFO memory), 82 denotes an error check circuit for the output of the register stack 81, 83 denotes a communication control circuit, 84 denotes an on-line flag register, 85 denotes a central processing unit, 86 denotes a memory, 87 denotes an error check circuit for inside registers in the central processing unit 85, and 88 denotes an error check circuit for the output of the memory 86.

The service processor instructs each processor to be in an on-line state or in an on-line state by writing "1" or "0" in the off-line flag register 84. The content of the off-line flag register 84 in each register is set to zero when the processor stops the operation by itself in response to detection of abnormality in the processor. The content of the off-line flag register 84 is supplied to the off-line detection unit $60_j$ as the aforementioned on-line/off-line signal. The register stack (FIFO memory) 81 is a data buffer circuit for storing in turn the data supplied from the data transfer control unit $50_j$. The up-down counter 54 in the data transfer control unit $50_j$ counts the amount of data stored in the register stack (FIFO memory) 81.

The error check circuits 82, 87, and 88 indicated in FIG. 7 are circuits for detecting abnormality in the processor. Any other circuits for detecting abnormality in a processor, known in the field, may be provided in the processor of FIG. 7, and the abnormality detected in the circuits is provided to the central processing unit 85. In response to the information on the abnormality, the central processing unit 85 resets the off-line flag register 84 to zero.

The communication control circuit 83 transmits and receives control signals for communication control (for example, of a handshake system) in accordance with a predetermined protocol under control of the central processing unit 85. For example, the aforementioned data enable signal is output from the communication control circuit 83.

Figure 8:
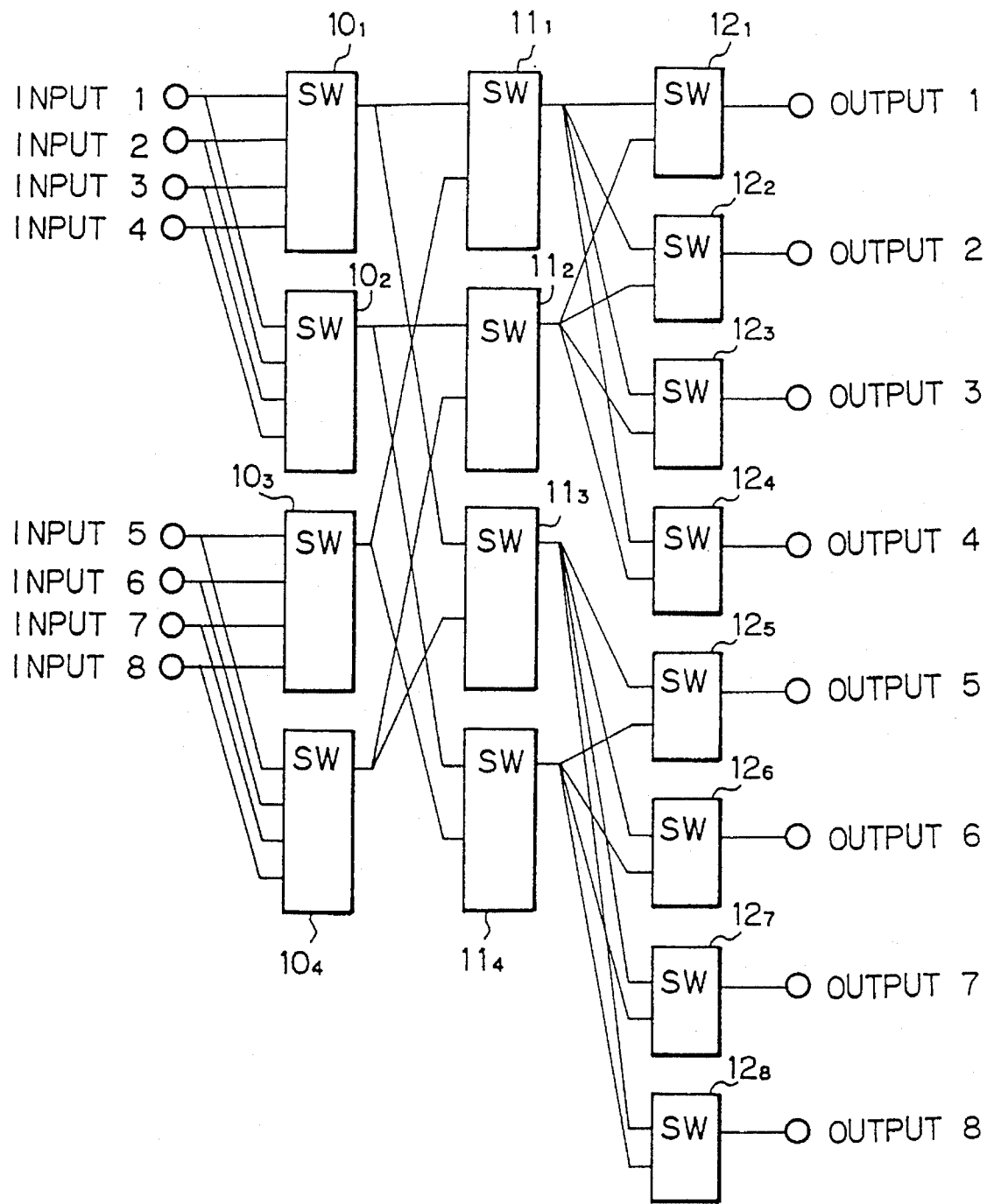
FIG. 8 is a diagram illustrating an example of an outlined construction of the networking apparatus.

FIG. 8 is a diagram illustrating an example of an outlined construction of the networking apparatus. Generally, the networking apparatus has a plurality of stages, and realizes a communication network having n inputs and m outputs, where n and m each an integer. The networking apparatus of FIG. 8 has three stages of switch units, eight input ports, and eight output ports. In FIG. 8, $10_1$ to $10_4$ each denote a switch unit in the first stage, $11_1$ to $11_4$ each denote a switch unit in the second stage, and $12_1$ to $12_4$ each denote a switch unit in the final stage. In FIG. 8, only routes for data transfer are indicated by lines connected between input ports and switch units in the first stage, between the switch units in the adjacent stages, and between the switch units in the final stage and the output ports. The flows of the control signals are explained later with reference to FIG. 9.

Figure 9:
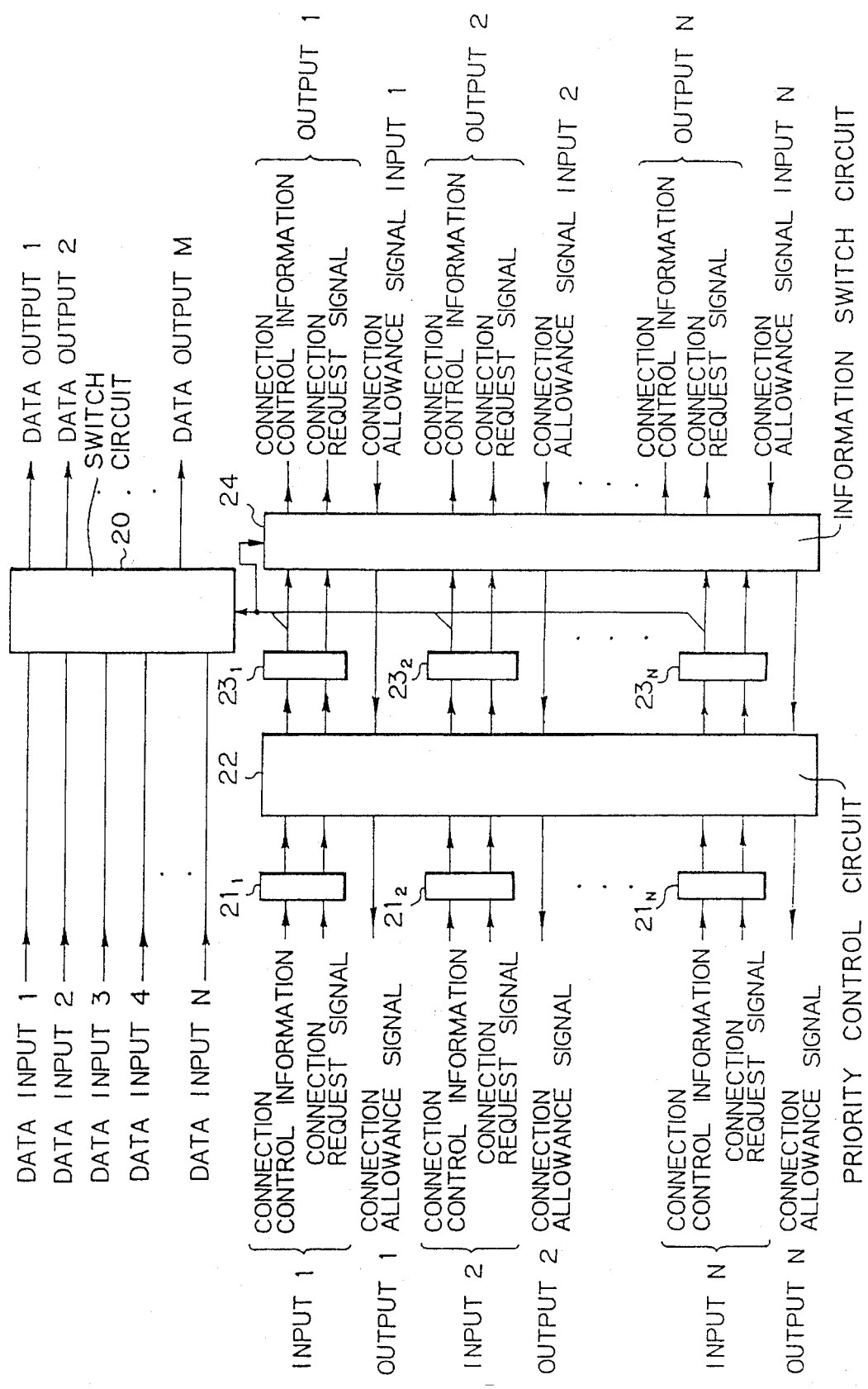
FIG. 9 is a diagram illustrating an example construction of the switch unit which is used in stages other than the final stage in a networking apparatus.

FIG. 9 is a diagram illustrating an example construction of the switch unit which is used in stages other than the final stage in a networking apparatus having a structure, for example, as indicated in FIG. 8. In FIG. 9, reference numeral 20 denotes a switch circuit, $21_1$, $21_2$, ... $21_N$ each denote a register on the request input side, 22 denotes a priority control circuit, $23_1$, $23_2$, ... $23_N$ each denote a register on the allowance output side, and 24 denotes an information switch circuit.

The switch circuit 20 provides a plurality of routes (paths) for data transfer operations between a plurality of processors. As explained below, the switch circuit 20 is controlled by a group of pieces of partial information to be used for controlling the switch circuit 20, among pieces of connection request information corresponding to connection request signals allowed by the priority control circuit 22. The switch circuit 20 in FIG. 9 comprises N data input ports and M data output ports, and can simultaneously establish a route connecting each of the N data input ports with the respectively corresponding one of the M data output ports. For example, in the case wherein the construction of FIG. 9 is one of the switch units in the first stage, the N data input ports of the switch circuit 20 are respectively connected to a plurality of data output ports (not shown) of a plurality of processors, and the M data output ports are respectively connected to one or more of the data input ports of one of the switch units in the second stage. Such a switch circuit can be easily constructed by combining a plurality of selector circuits in a plurality of stages. In this case, the above control of switch circuit is equal to control of the selector circuits in the switch circuit 20.

Each of the processors stores in a memory (not shown) provided therein, a list of pieces of connection control information to be supplied to the networking apparatus for establishing routes for transferring data to the other processors, respectively. The respective piece of connection control information indicates what control information is to be transferred to the respective switch units in the respective stages of the networking apparatus. For example, in the case wherein the networking apparatus comprises three stages as indicated in FIG. 8, the connection control information comprises a piece of control information to be transferred to the switch circuit 20 in a switch unit in the first stage, a piece of control information to be transferred to the switch circuit 20 in a switch unit in the second stage, and a piece of control information to be transferred to the switch circuit 20 in a switch unit in the final stage. Generally, more than one route may be established from one processor to another processor, and therefore, more than one piece of such connection control information may be stored for each address (processor), in the above memory.

When one of the processors is required to transfer data to another processor, the processor on the sending side reads one piece of the connection control information for a route to the above other processor, from the above list, and transfers the set of connection control information together with a connection request signal, through a corresponding one of the data input ports of a switch unit to which the processor on the sender side is connected. In the case wherein the construction of FIG. 9 is one of the switch units in the first stage, the plurality of registers $21_1, 21_2, \ldots 21_N$ on the request input side, which are provided on the request input side of the priority control circuit 22, are respectively connected to the output ports for the connection control information and the connection request signals, in the respectively corresponding processors. The plurality of registers $21_1, 21_2, \ldots 21_N$ on the request input side, are provided corresponding to the data input ports of the switch circuit 20. Thus, the connection control information and the connection request signals from the processors (on the sender side) are respectively latched in the plurality of registers $21_1, 21_2, \ldots 21_N$ on the request input side of the priority control circuit 22, and are applied to the priority control circuit 22.

Generally, more than one processor may simultaneously send a plurality of connection request signals and a plurality of pieces of connection control information accompanying the respective connection request signals, to the plurality of registers $21_1, 21_2, \ldots 21_N$ on the request input side. The priority control circuit 22 receives the above-mentioned pieces of partial information included in the pieces of connection control information accompanying the connection request signals, and simultaneously gives allowances to the connection request signals corresponding to the pieces of connection control information when the above pieces of partial information in the connection control information indicate requests for routes which can be simultaneously established by the switch circuit 20, or gives an allowance to one of the connection request signals corresponding to the pieces of connection control information when the above pieces of partial information in the connection control information indicates requests for routes which cannot be simultaneously established by the switch circuit 20. The above one of the connection request signals is determined based on a predetermined priority order, taking into consideration the condition that an allowance(s) is obtained for the piece of connection control information corresponding to the connection request signal, in one or more switch units in all of the following stage(s), as explained later.

On the output side of the priority control circuit 22, a plurality of registers $23_1, 23_2, \ldots 23_N$ on the allowance output side, are provided corresponding to the plurality of registers on the input side of the priority control circuit 22. The connection request signal allowed by the priority control circuit 22 and the accompanying piece of connection control information pass through the priority control circuit 22, and are latched in the corresponding one of the registers $23_1, 23_2, \ldots 23_N$ on the allowance output side.

The priority control circuit receives a plurality of connection requests, and outputs an allowance to one of the connection requests in accordance with a predetermined priority order when the plurality of requests compete. Since various constructions are known for realizing such a priority control circuit, details of the construction of the priority control circuit are not shown here.

Thus, the connection request signals and accompanying pieces of connection control information are output from the respectively corresponding registers $23_1, 23_2, \ldots 23_N$ on the allowance output side. The above-mentioned pieces of partial information to be used for controlling the switch circuit 20, included in the pieces of connection control information, are divided, and are applied to the control input terminals of the switch circuit 20. Thus, the switch circuit 20 can be controlled by the control information allowed by the priority control circuit 22 so that the routes according to the control information allowed by the priority control circuit 22 are established in the switch circuit 20.

The above pieces of partial information applied to the switch circuit 20, are also applied to the information switch circuit 24 for controlling the information switch circuit 24. The information switch circuit 24 has a construction similar to the construction of the switch circuit 20. The switch circuit 20 provides the routes for transferring data, while the information switch circuit 24 is provided for transferring connection request signals and pieces of connection control information used for establishing the routes for the data transfer in the switch circuit 20, located along the respectively corresponding routes for the data transfer in the same directions as those of the corresponding data transfer operations, and transfers connection allowance signals which are returned from the switch unit(s) in the following stages, along the above routes in the directions opposite to those of the corresponding data transfer operations. Therefore, switching in the switch circuit 20 and the information switch circuit 24 are performed in the same manner and at the same timing. The output of each of the registers $23_1, 23_2, \ldots 23_N$ in the above switch unit is applied to a corresponding input terminal of a register provided on the request input side of a priority control circuit in another switch unit which contains another switch circuit to which the output data of the switch circuit 20 of the above switch unit is applied.

The above connection allowance signal indicates whether or not a route is allowed (established) in all of the following stage(s) in response to a corresponding connection request signal and an accompanying piece of connection control information. When a route is allowed (established) in all of the following stage(s) in response to a corresponding connection request signal and an accompanying piece of connection control information, the connection allowance signal is active.

Each of the above connection allowance signals, returned from a switch unit in the following stage, is input from a corresponding input terminal of the priority control circuit 22 through the information switch circuit 24. The priority control circuit 22 recognizes whether or not a route is allowed (established) in all of the following stage(s) in response to a corresponding connection request signal and an accompanying piece of connection control information, based on whether or not the connection allowance signal is active. A priority control circuit in each of the switch unit(s) in the following stage(s), operates in the same way as the above explained priority control circuit 22 of FIG. 9. In order to determine whether or not a route corresponding to a connection request signal which is allowed in the priority control circuit 22, is allowed (established) in all of the following stage(s) in response to a corresponding connection request signal and an accompanying piece of connection control information, the priority control circuit 22 transfers connection request signals allowed therein and pieces of connection control information accompanying the allowed connection request signals to the switch units in the following stage, and receives corresponding connection allowance signals returned from the switch units in the following stage. An allowance to a connection request signal is confirmed when an active connection allowance signal in response to the connection request signal is received from the following stage. An allowance to a connection request signal is not confirmed when an inactive connection allowance signal is received from the following stage, in response to the connection request signal. Then, the priority control circuit 22 stops the output therefrom of the connection request signal which is not confirmed and a piece of connection control information accompanying the connection request signal. When the priority control circuit 22 receives one or more other connection request signals which have not been allowed by the priority control circuit 22, the priority control circuit 22 gives an allowance to one of such connection request signals having the highest priority among the connection request signals, according to the predetermined priority order. Thus, the newly allowed connection request signal and a piece of connection control information accompanying the allowed connection request signal, are output from the priority control circuit 22, instead of the above connection request signal which is not confirmed by the connection allowance signal from the following stage and the accompanying piece of connection control information. Then, the confirmation of the allowance by the connection allowance signal from the following stage is performed for the new connection request signal and the accompanying connection control information.

When each route is established by the above operations in the priority control circuit 2, the priority control circuit 22 generates a connection allowance signal, and outputs the same from a corresponding connection allowance signal output terminal, which is provided on the request input side of the priority control circuit 22. In the case wherein the switch unit of FIG. 9 is not in the first stage, the output of the connection allowance signal is applied to a connection allowance signal input terminal of the information switch circuit 24 in the corresponding switch unit in the preceding stage. In the case wherein the switch unit of FIG. 9 is in the first stage, the output of the connection allowance signal is transferred to the processor which outputs the Connection request signal corresponding to the connection allowance signal. The connection allowance signal transferred to the processor which outputs the connection request signal corresponding to the connection allowance signal, indicates that "a physical link in response to the connection request signal is established in the networking apparatus." The processor can start the operation of transferring data in accordance with a predetermined protocol when the connection allowance signal is received.

Figure 10:
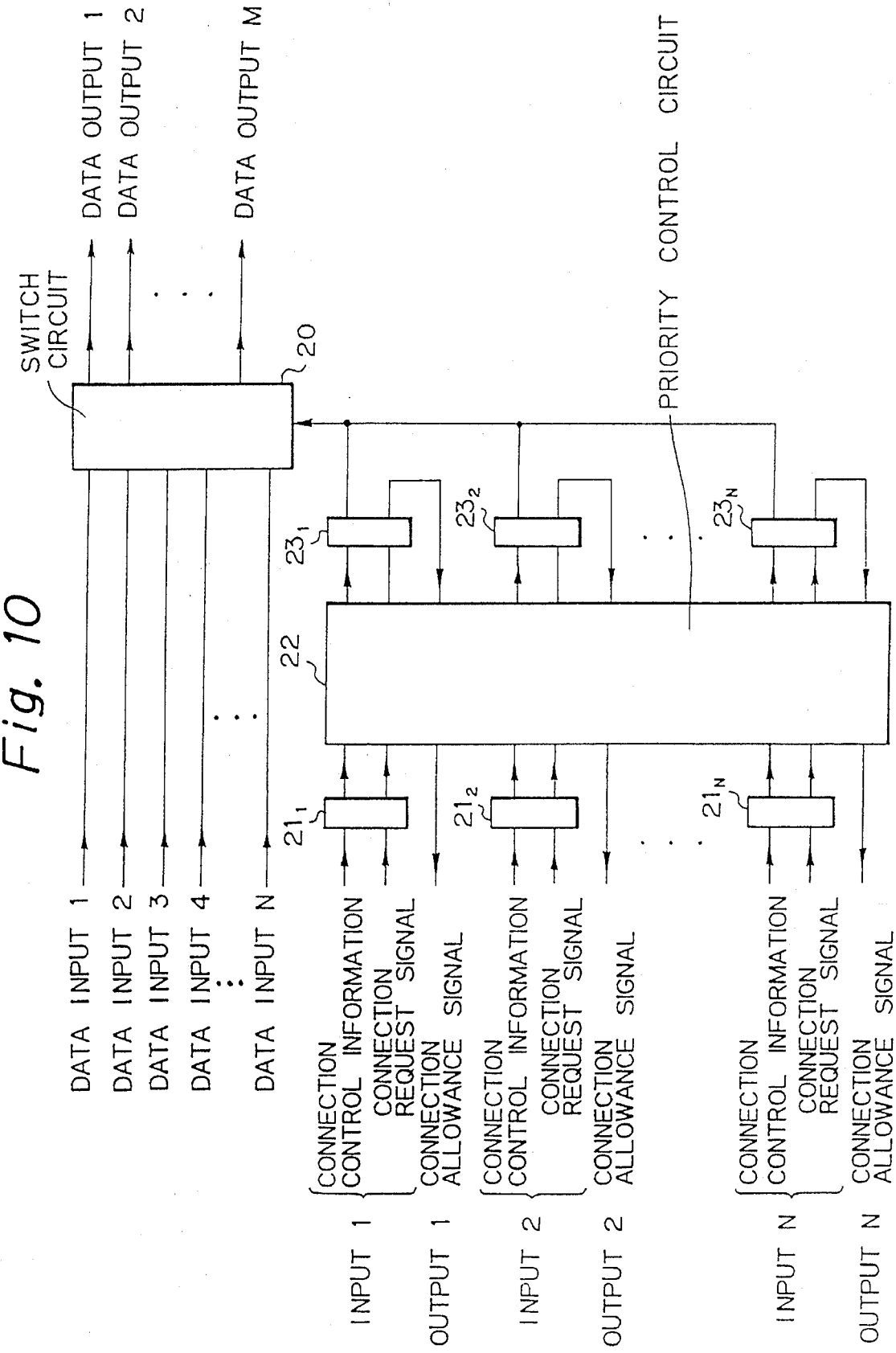
FIG. 10 is a diagram illustrating an example construction of the switch unit to be used in the final stage in the networking apparatus.

FIG. 10 is a diagram illustrating an example construction of the switch unit to be used in the final stage in the networking apparatus having a structure, for example, as indicated in FIG. 8. Since there is no transfer operation of connection request signals and the connection control information to the following stage, and no receipt of the connection allowance signals in a switch unit in the final stage, the information switch circuit 24 (FIG. 9) is unnecessary. The connection request signals allowed by the priority control circuit 22 in the switch unit of the final stage, are directly applied to the connection allowance signal input terminals of the priority control circuit 22.

The data outputs of the switch circuit 20 in the switch unit in the final stage, are respectively connected to data input ports (not shown) of the corresponding processors which are destinations of the routes established in the networking apparatus.

What is claimed is:

1. A multi-processor system comprising:

a networking apparatus; and a plurality of processors for transferring data through the networking apparatus from one of the plurality of processors to another of the plurality of processors, wherein at least one first processor among the plurality of processors comprises transmitting means, connected to the networking apparatus, for transmitting data to the networking apparatus, at least one second processor among the plurality of processors comprises:

receiving means, connected to the networking apparatus, for receiving data transferred from the networking apparatus, transfer allowance signal transmitting means for transmitting a transfer allowance signal to the networking apparatus when the receiving means is ready to receive data and the at least one second processor is in an on-line state, and on-line/off-line signal transmitting means for transmitting an on-line/off-line signal to the networking apparatus, the on-line/off-line signal indicating by a voltage level thereof whether the at least one second processor is in one of the on-line state and an off-line state;

said networking apparatus comprising:

switch means for providing a route for transferring data between each of the at least one first processor and a respective one of the at least one second processor corresponding to each first processor, data transfer control means, provided corresponding to each of said at least one second processor, on an output side of said switch means and, on each route for transferring data, for receiving from said switch means the data transferred between one of the at least one first processor connected to the route and one of the at least one second processor corresponding to said one of the at least one first processor, temporarily storing the data, and transferring the data to said one of the at least one second processor connected to the route, when the data transfer control means receives the transfer allowance signal from the second processor, and off-line state detecting means, provided corresponding to each of said data transfer control means, for receiving the on-line/off-line signal, directly from said one of the at least one second processor connected to the route, detecting said voltage level of the on-line/off-line signal, and generating and outputting a data discharge control signal to the data transfer control means, when the on-line/off-line signal indicates that the at least one second processor is in the off-line state; and the data transfer control means further comprises data discharge means for receiving the data discharge control signal, and for discharging the data temporarily stored in the data transfer control means in response to the data discharge control signal, regardless of the transfer allowance signal.

2. A multi-processor system according to claim 1, wherein the receiving means comprises a buffer memory for temporarily storing the data transferred from the data transfer control means, the transfer allowance signal transmitting means outputs the transfer allowance signal when the data temporarily stored in the buffer is output therefrom, and the data transfer control means comprises:

a FIFO memory receiving the data transferred from the at least one first processor connected to the route on which the data transfer control means is provided, for temporarily storing the data, and for outputting the data, and a counter counting an amount of the data temporarily stored in the buffer memory in the receiving means by incrementing a value of a count thereof when the data is output from the FIFO memory, and decrementing the value of the count when the data transfer control means receives the transfer allowance signal.

3. A multi-processor system according to claim 2, wherein the counter outputs a first control signal is applied to the FIFO memory to make the FIFO memory stop outputting the data to the receiving means, when the count reaches a predetermined count corresponding to a maximum amount of data which can be held in the buffer memory.

4. A multi-processor system according to claim 3, wherein the counter further outputs a second control signal active when the count is equal to zero, and the off-line state detecting means makes the data discharge control signal active when the second control signal is not active, and the on-line/off-line signal indicates that the second processor is in the off-line state.

5. A multi-processor system according to claim 4, wherein the data discharge control signal is applied to the counter as a countdown control signal which makes the counter decrement the value of the count.

6. A networking apparatus for use in a multiprocessor system comprising a networking apparatus and a plurality of processors for transferring data through the networking apparatus from one of the plurality of processors to another of the plurality of processors, wherein at least one first processor among the plurality of processors transmits the data to the networking apparatus, and at least one second processor among the plurality of processors receives data transferred from the networking apparatus, transmits a transfer allowance signal to the networking apparatus when the at least one second processor is ready to receive data and the at least one second processor is in an on-line state, and transmits an on-line/off-line signal to the networking apparatus, where the on-line/off-line signal indicates, by a voltage level thereof, whether the at least one second processor is in one of the on-line state and an off-line state, said networking apparatus comprising:

switch means for providing a route for transferring data between each of the at least one first processor, and a respective one of the at least one second processor corresponding to each first processor, data transfer control means, provided corresponding to each of said at least one second processor, on an output side of said switch means, and on each route for transferring data, for receiving from said switch means the data transferred between one of the at least one first processor connected to the route and one of the at least one second processor corresponding to said one of the at least one first processor, temporarily storing the data, and transferring the data to said one of the at least one second processor connected to the route, when the data transfer control means receives the transfer allowance signal from the second processor, and off-line state detecting means, provided corresponding to each of said data transfer control means, for receiving an on-line/off-line signal, directly from said one of the at least one second processor connected to the route, detecting said voltage level of the on-line/off-line signal, and generating and outputting a data discharge control signal to the data transfer control means, when the on-line/off-line signal indicates that the at least one second processor is in the off-line state; and the data transfer control means further comprising data discharge means for receiving the data discharge control signal, and for discharging the data temporarily stored in the data transfer control means in response to the data discharge control signal, regardless of the transfer allowance signal.

7. A networking apparatus according to claim 6, wherein the at least one second processor comprises a buffer memory for temporarily storing the data transferred from the data transfer control means, and outputs the transfer allowance signal when the data temporarily stored in the buffer memory is output therefrom, and the data transfer control means in the networking apparatus comprises:

a FIFO memory receiving the data transferred from the first processor connected to the route on which the data transfer control means is provided, for temporarily storing the data, and for outputting the data, and a counter for counting an amount of the data temporarily stored in the buffer memory by incrementing a value of a count thereof when the data is output from the FIFO memory, and decrementing the value of the count when the data transfer control means receives the transfer allowance signal.

8. A networking apparatus according to claim 7, wherein the counter outputs a first control signal applied to the FIFO memory to make the FIFO memory stop outputting the data to the receiving means, when the count reaches a predetermined count corresponding to a maximum amount of data which can be held in the buffer memory.

9. A networking apparatus according to claim 8, wherein the counter further outputs a second control signal active when the count is equal to zero, the off-line state detecting means makes the data discharge control signal active when the second control signal is not active, and the on-line/off-line signal indicates that the second processor is in the off-line state.

10. A networking apparatus according to claim 9, wherein the data discharge control signal is applied to the counter as a countdown control signal which makes the counter decrement the value of the count.

* * * * *

UNITED STATES PATENT AND TRADEMARK OFFICE
CERTIFICATE OF CORRECTION

PATENT NO. : 5,513,321
DATED : April 30, 1996
INVENTOR(S) : Masayuki KATORI

It is certified that error appears in the above-indentified patent and that said Letters Patent is hereby corrected as shown below:

Col. 1, line 37, change "11 to in" to --$l_1$ to $l_n$--.

Col. 3, line 7, after "addition" insert --,--; and line 28, delete "and".

Signed and Sealed this

Twenty-eighth Day of January, 1997

Attest:

BRUCE LEHMAN

Attesting Officer     Commissioner of Patents and Trademarks